(12) United States Patent
Weinstein et al.

(10) Patent No.: US 10,554,475 B2
(45) Date of Patent: Feb. 4, 2020

(54) SANDBOX BASED INTERNET ISOLATION IN AN UNTRUSTED NETWORK

(71) Applicant: L3 Technologies, Inc., New York, NY (US)

(72) Inventors: Jay Weinstein, Churchville, PA (US); Mark Fenkner, Marlton, NJ (US); Charles King, Plano, TX (US); Ismael Lopez, Bronx, NY (US); Peter Martz, Blenheim, NJ (US)

(73) Assignee: L3Harris Technologies, Inc., Melbourne, FL (US)

( * ) Notice: Subject to any disclaimer, the term of this patent is extended or adjusted under 35 U.S.C. 154(b) by 288 days.

(21) Appl. No.: 15/637,951

(22) Filed: Jun. 29, 2017

(65) Prior Publication Data
US 2019/0007257 A1    Jan. 3, 2019

(51) Int. Cl.
| H04L 29/06 | (2006.01) |
| G06F 21/53 | (2013.01) |
| G06F 21/56 | (2013.01) |
| H04L 29/08 | (2006.01) |

(52) U.S. Cl.
CPC ........ H04L 29/06564 (2013.01); G06F 21/53 (2013.01); G06F 21/566 (2013.01); H04L 63/0227 (2013.01); H04L 63/168 (2013.01); H04L 67/02 (2013.01)

(58) Field of Classification Search
CPC ............................ H04L 29/6564; G06F 21/00
USPC ......................................................... 726/26
See application file for complete search history.

(56) References Cited

U.S. PATENT DOCUMENTS

| 7,478,330 B1 | 1/2009 | Branson et al. |
| 7,698,442 B1 | 4/2010 | Krishnamurthy et al. |
| 7,805,516 B2 | 9/2010 | Kettler et al. |
| 8,479,279 B2 * | 7/2013 | Li .......................... G06F 21/33 726/1 |
| 9,942,198 B2 * | 4/2018 | Hoy .................... H04L 63/0272 726/15 |

(Continued)

FOREIGN PATENT DOCUMENTS

RU    2406138 C1    12/2010

OTHER PUBLICATIONS

Burnett, Mark, "How I Secured One Company's Network", Using Log Parser, Virtualization, and a Little Psychology, Sep. 17, 2006, 4 pages.

(Continued)

*Primary Examiner* — Longbit Chai
(74) *Attorney, Agent, or Firm* — Condo Roccia Koptiw LLP (57) ABSTRACT

Methods and systems are disclosed for a sandbox based internet isolation in an untrusted network. A host computer system may include a host-based firewall, an operating system, a first memory space, and a second memory space. The host-based firewall may be configured to prevent unauthorized communication between the trusted host computer system and one or more other devices on an untrusted LAN and/or the Internet. The second memory space may be configured to enable storage and/or operation of one or more applications and/or processes associated with a sandboxed computing environment. The host computer system may include a sandbox firewall that enforces separation of the first and second memory spaces.

20 Claims, 3 Drawing Sheets

(56) References Cited

U.S. PATENT DOCUMENTS

| | | | |
|---|---|---|---|
| 2002/0069369 | A1 | 6/2002 | Tremain et al. |
| 2006/0070066 | A1 | 3/2006 | Grobman |
| 2007/0220187 | A1 | 9/2007 | Kates |
| 2007/0260873 | A1 | 11/2007 | Hatfalvi et al. |
| 2008/0028401 | A1 | 1/2008 | Geisinger |
| 2008/0201711 | A1 | 8/2008 | Amir Husain |
| 2008/0256536 | A1 | 10/2008 | Zhao et al. |
| 2009/0172781 | A1 | 7/2009 | Masuoka et al. |
| 2009/0328038 | A1 | 12/2009 | Yamada et al. |
| 2010/0138829 | A1 | 6/2010 | Hanquez et al. |
| 2010/0138830 | A1 | 6/2010 | Astete et al. |
| 2010/0223613 | A1 | 9/2010 | Schneider |
| 2010/0251329 | A1 | 9/2010 | Wei |
| 2012/0023593 | A1 | 1/2012 | Puder et al. |
| 2012/0054853 | A1* | 3/2012 | Gupta ..................... G06F 21/53 726/17 |
| 2013/0318594 | A1 | 11/2013 | Hoy et al. |
| 2015/0134956 | A1 | 5/2015 | Stachura et al. |
| 2017/0019422 | A1 | 1/2017 | Makowski et al. |
| 2018/0270200 | A1 | 9/2018 | Byrne et al. |
| 2019/0058597 | A1* | 2/2019 | Lim ........................ G06F 21/55 |

OTHER PUBLICATIONS

Laverick, Mike, "Hypervisor Management and Optimization for Advanced Virtualization", E-book, TechTarget, 2010.

Li et al., "VSITE: A Scalable and Secure Architecture for Seamless L2 Enterprise Extension in the Cloud", 6th IEEE Workshop on Secure Network Protocols (NPSec), Oct. 2010.

Reuben, Jenni Susan, "A Survey on Virtual Machine Security", TKK T-110.5290 Seminar on Network Security, Oct. 11-12, 2007, 5 pages.

Villeneuve, Nart, "Command and Control in the Cloud", Malware Explorer, Oct. 22, 2010.

Wikipedia, "Computer Networking", Available at https://en.wikipedia.org/wiki/Computer_network, Dec. 2010, 19 pages.

Wikipedia, "Computer Security", Available at https://en.wikipedia.org/wiki/Computer_security, retrieved on Dec. 2010, 27 pages.

Wikipedia, "Cyber Security Standards", Available at https://en.wikipedia.org/wiki/Cyber_security_standards, retrieved on Dec. 2010, 9 pages.

Wikipedia, "HTTP Secure", Available at https://en.wikipedia.org/wiki/HTTPS, retrieved on Dec. 2010, 9 pages.

Wikipedia, "Hypervisor", Available at <https://en.wikipedia.org/wiki/Hypervisor> , retrieved on Dec. 2010, 6 pages.

Wikipedia, "Internet Protocol", Available at https://en.wikipedia.org/wiki/Internet_Protocol, retrieved on Dec. 2010, 5 pages.

Wikipedia, "Multiprotocol Label Switching", Available at <https://en.wikipedia.org/wiki/Multiprotocol_Label_Switching> , retrieved on Dec. 2010, 8 pages.

Wikipedia, "Network Address Translation", Available at https://en.wikipedia.org/wiki/Network_address_translation, Dec. 2010, 12 pages.

Wikipedia, "Security-Focused Operating System", Available at https://en.wikipedia.org/wiki/Security-focused_operating_system, retrieved on Dec. 2010, 9 pages.

Wikipedia, "Virtual Desktop", Available at https://en.wikipedia.org/wiki/Virtual_desktop, retrieved on Dec. 2010, 5 pages.

Wikipedia, "Virtual Private Network", Available at https://en.wikipedia.org/wiki/Virtual_private_network, retrieved on Dec. 2010.

* cited by examiner

SANDBOX BASED INTERNET ISOLATION IN AN UNTRUSTED NETWORK

CROSS-REFERENCE TO RELATED APPLICATIONS

This application incorporates by reference the subject matter of U.S. patent application Ser. No. 15/637,878, entitled SANDBOX BASED INTERNET ISOLATION IN A TRUSTED NETWORK, filed contemporaneously herewith on Jun. 29, 2017.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware.

The security and privacy of the user of the infected host computer system user may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

Loss of command and control of the infected host computer system may include performing one or more action the author of the downloaded malware may desire. For example, the malware may perform a reconnaissance of the infected host computer system, determine system privileges, access local files, access security tokens, and/or attempt infection of or access of other network resources accessible from the infected host computer system.

SUMMARY OF THE INVENTION

Methods and systems are disclosed for a sandbox based internet isolation system in an untrusted network. A host computer system may be configured to connect to an untrusted local area network (LAN). The host computer system may include a processor and a memory configured to implement a first firewall, a first memory space, and/or a second memory space. The first memory space may be configured to enable storage and/or operation of a workspace. The workspace may be configured to execute a first set of one or more applications and/or processes running on an operating system of the host computer system. The second memory space may be configured to enable storage and/or operation of a second set of one or more applications and/or processes associated with a sandboxed computing environment. The sandboxed computing environment may be associated with a sandbox container process configured to run on the operating system. The second set of one or more applications and/or processes may include a browser process. The browser process may be configured to operate within the sandboxed computing environment. The browser program may be configured to access the Internet and/or other untrusted resources. The sandboxed computing environment may be enforced via the sandbox container process. The sandbox container process may segregate the workspace associated with the first memory space from the sandboxed computing environment associated with the second memory space. The sandbox container process may be configured to prevent data from being communicated between the sandboxed computing environment and the workspace without an explicit user input.

The first firewall may be a host-based firewall. The first firewall may be configured to operate between the workspace of the first memory space and the untrusted LAN. The first firewall may be configured to determine whether the host computer system is connected to a trusted LAN or an untrusted LAN. The first firewall may implement a first configuration when the host computer system is connected to the trusted LAN. The first firewall may implement a second configuration when the host computer system is connected to the untrusted LAN. The second configuration of the first firewall may prevent unauthorized communications between the first set of one or more applications and/or processes and one or more untrusted network destinations. The second configuration of the first firewall may allow at least the sandboxed browser program to communicate with the untrusted resources. The first configuration of the first firewall may allow the first set of one or more applications and/or processes to send one or more communications directly to one or more network destinations on the trusted LAN, for example, without requiring the first set of one or more applications and/or processes to utilize a predetermined set of communication protocols.

The second configuration implemented by the first firewall may allow one or more of the first set of applications and/or processes to communicate with a trusted network destination using a predetermined set of communication protocols. The predetermined set of communication protocols may include communicating with the trusted network destination via a Virtual Private Network (VPN) client associated with the workspace. The trusted network destination may be located on a trusted LAN. The VPN client may be configured to establish an encrypted communication system with the trusted network destination via the untrusted LAN. The second configuration of the first firewall may allow one or more of the first set of one or more applications and/or processes to access the trusted LAN via the untrusted LAN and/or the Internet using the VPN client. The VPN client may be configured to enable access to the trusted LAN via the untrusted LAN and/or the Internet.

The workspace may include one or more host monitoring processes. The one or more host monitoring processes may be configured to monitor operation of the sandbox container process. The one or more host monitoring processes may be configured to restore the sandbox container process to a known good version. The one or more host monitoring processes may restore the sandbox container process to the known good version based on one or more of a user input, an application input, detection of an abnormality in the sandbox container process, or expiration of a predefined time. The second configuration of the first firewall may allow the one or more host monitoring processes to communicate with a trusted central monitoring system. The one or more host monitoring processes may communicate with the trusted central monitoring system in order to communicate information regarding the monitoring of the sandbox container process. The trusted central monitoring system may be located on the trusted LAN. The one or more host monitoring processes may be configured to communicate with the trusted central monitoring system with a predetermined communication protocol, for example, that is permitted by the second configuration of the first firewall. When the one or more host monitoring processes are unable to communicate with the trusted central monitoring system, one or monitoring events may be logged, for example, by the one or more host monitoring processes. The one or more host monitoring processes may be configured to send the log to the trusted central monitoring system, for example, upon establishing a communication channel with the trusted central monitoring system.

DETAILED DESCRIPTION

Systems and methods are disclosed for using sandbox internet isolation to limit and/or segregate security threats while connected to an untrusted local area network (LAN). A host computer system may securely browse, access, and/or communicate with untrusted network destinations, including but not limited to resources accessible via the Internet. The host computer system may be connected to an untrusted LAN and may have a sandbox protected application, such as a sandbox protected browser, and/or a firewall running thereon. For example, the sandbox protected application may operate within a sandboxed computing environment. The sandboxed computing environment may include resources (e.g., a limited set of resources) allocated to operation of a sandbox container process. The sandboxed computing environment may be enforced via the sandbox container process. The sandbox container process may be a security mechanism used to separate the sandboxed computing environment from other applications and/or processes that may be running on a workspace of the host computer system. The sandbox container process may be configured to enable one or more applications and/or processes (e.g., such as a browser process) being executed within the sandboxed computing environment to access the resources allocated for operation of the sandboxed computing environment. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace.

The workspace may include one or more processes operating within the operating system that are not restricted by the sandbox container process. The operating system of the host computer system may include a set of resources configured to enable operation of the workspace and the sandbox container process. The sandbox container process may be allowed to access both a first memory region associated with the workspace and a second memory region associated with the sandboxed computing environment, for example in order to enforce the partition between the memory regions and/or to enforce rules associated with operation in the workspace and/or sandboxed computing environment.

The sandbox container process may have access to one or more operating system and/or kernel processes in order to enforce isolation between the workspace associated with the first memory space and the sandboxed computing environment associated with the second memory space. The sandbox container process may enforce the segregation using techniques such as namespace isolation such the that processes running on the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating resources (e.g., including the kernel and libraries) while enforcing the segregation of the memory spaces access by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

A browser process operating within the sandboxed computing environment may be permitted to access untrusted network destinations via an access connection device. For example, the browser process operating within the sandboxed computing environment may connect to the untrusted network destinations as a dedicated network interface device with using a specific Internet Protocol (IP) address. The browser process operating within the sandboxed computing environment may be referred to as a sandbox browser process. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with the trusted LAN. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the browser process operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

The host computer system may include a host-based firewall. The host-based firewall may be configured to block incoming communications destined for the workspace. The host-based firewall may allow outgoing communications to be sent from a process workspace to a trusted LAN destination, for example, via a Virtual Private Network (VPN) client. The host-based firewall may be configured to determine whether the workspace is connected to a trusted or untrusted LAN and may apply different configurations depending on whether the workspace is communicating via the trusted LAN or the untrusted LAN.

The browser process operating within the sandboxed computing environment may run in a separated and/or isolated memory space from the workspace of the host computer system. For example, one or more applications and/or processes (e.g., such as the browser process) operating within the sandboxed computing environment may be segregated to a sandbox memory space that is separated and/or isolated from a memory space configured to enable storage and/or operation of the workspace on the host computer system. The applications and/or processes operating within the sandboxed computing environment may not access any additional resources of the host computer system without user action. For example, the sandbox container process and/or a sandbox firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host computer system generally, such as local area networks (e.g., via a VPN client) and secure memory regions.

Certain actions may be allowed to be performed by the sandbox firewall with approval by the user of the host computer system. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more transfers of data between the sandboxed computing environment and the workspace except those user initiated actions described herein. For example, the sandbox container process may prevent unauthorized data transfers between the sandboxed computing environment and the workspace.

Figure 1:
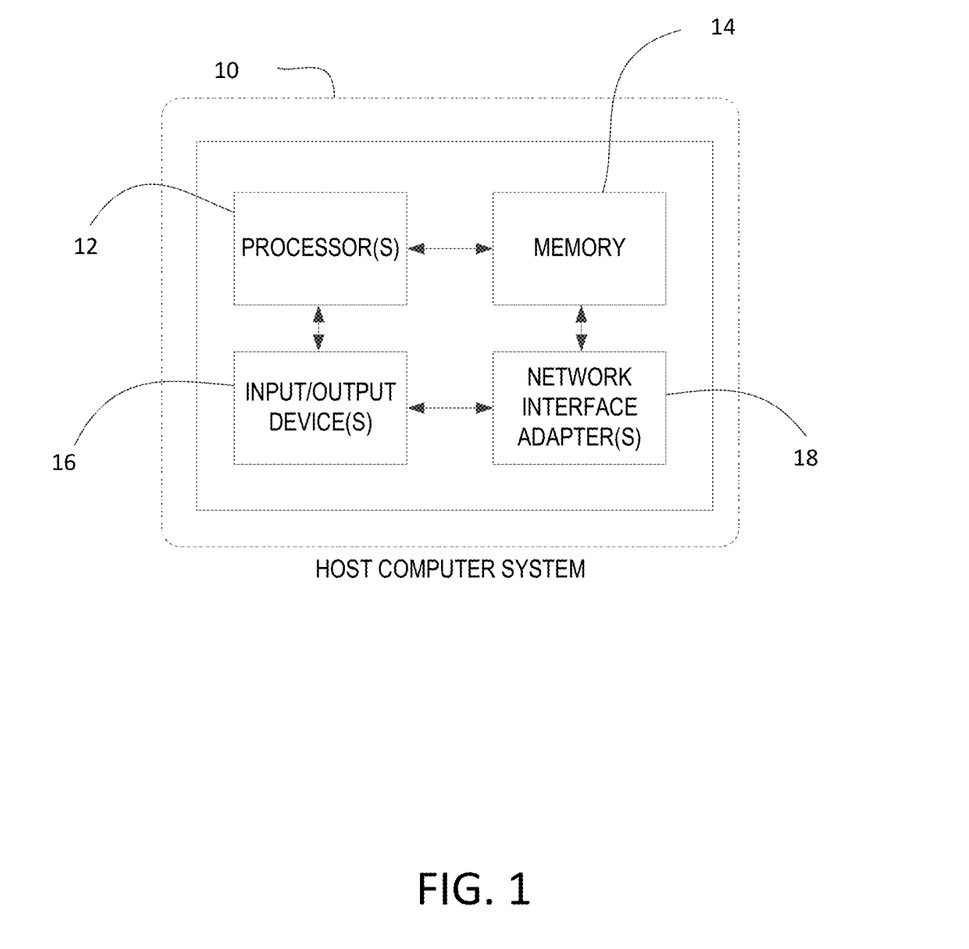
FIG. 1 depicts an example of a host computing system.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox-based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one or more file descriptors, memory, file system space, etc. For example, the applications and/or processes operating within the sandboxed computing environment may be permitted to access certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include a sandbox firewall. The sandbox firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected browser may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox firewall may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware and/or any other remote devices. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access of other websites for denial of service attacks, and/or convert the infected host computer system into a source of malicious software from which toolsets or secondary payloads are downloaded to other, subsequently infected, host computer systems.

Use of a sandbox based computing environment to enforce internet isolation may offer several advantages as compared to other isolation techniques such as the use of virtual machines. For example, isolating a browser process or other applications and/or processes in a sandboxed computing environment rather than in a virtual machine may utilize less computing resources, which may improve the overall user experience. As an example, a virtual machine could be used to isolate a browser process; however, such an implementation would rely on access to a larger set of computing resources (e.g., more memory usage, more frequent processing usage, larger number of processes running overall, etc.) than a browser process operating in a sandboxed computing environment. The larger relative footprint of the virtual machine can draw resources away from other applications being implemented on the host computer system. By using a sandbox based isolation technique, fewer resources may be used by the browser, allowing for a more seamless user experience for other applications.

Figure 2:
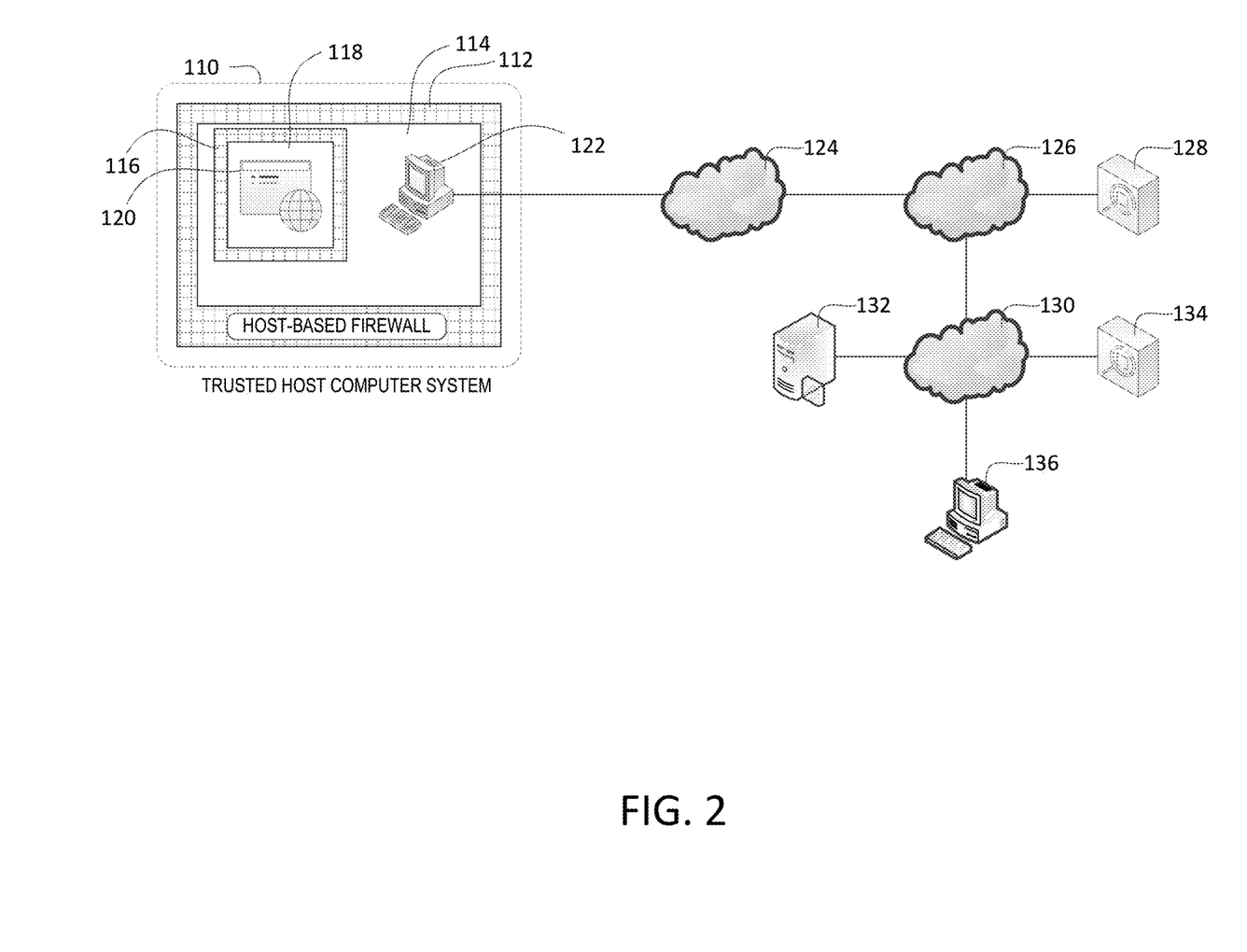
FIG. 2 depicts an example trusted host computer system using a sandbox based internet isolation system on an untrusted local area network (LAN).

FIG. 2 depicts an example trusted host computer system 110 connected to an untrusted local area network (LAN) 124. The trusted host computer system 110 may include and untrusted portion operation thereon. The trusted host computer system 110 may include an operating system 122 and a sandboxed computing environment 118 (e.g., an internet isolation system) that is configured to be executed on a restricted or isolated portion of the operating system 122. The sandboxed computing environment may be the untrusted portion operating on the trusted host computer system 110. The sandboxed computing environment 118 may be prevented from accessing portions of the operating system 122 that are not associated with the limited or isolated resources dedicated to the sandbox. A sandbox browser program 120 may execute within the sandboxed computing environment 118. The sandbox browser program 120 may be allowed to access computing resources that are associated with or segregated for the sandboxed computing environment 118 but may be restricted or prevented from accessing computing resources of the operating system 122 that are outside of the sandboxed computing environment 118.

The trusted host computer system 110 may include a host-based firewall 112, an operating system 122, the sandboxed computing environment 118, a sandbox firewall 116, and a workspace 114. The trusted host computer system 110 may be any host computer system, such as a personal computer (PC), a laptop, a virtual machine, and/or any of a variety of other host computer systems operatively connected with one or more user-accessible data entry devices, a display device viewable by a user, and a computer-accessible data storage. The trusted host computer system 110 may include an operating system 122 and one or more application programs on the operating system 122.

As an example, the trusted host computer system 110 may be a PC, with 4 GB RAM and 146 GB hard disk computer-accessible storage, a monitor, a keyboard, and a mouse. The operating system 122 may be Windows-based, Linux-Based, Macintosh-based, and/or the like. The computer-accessible storage may store data corresponding to the software (e.g., computer-readable instructions) stored on the trusted host computer system 110 for common operation. Software programs may include word processing programs, accounting programs, remote connectivity programs, and/or other types of applications.

The sandboxed computing environment 118 may include resources (e.g., a limited set of resources) allocated to operation of a sandbox container process. The sandboxed computing environment 118 may be enforced via the sandbox container process. The sandbox container process may be a security mechanism used to separate resources associated with the sandboxed computing environment 118 from other applications and/or processes that may be running on a workspace 114 of the trusted host computer system 110. The sandboxed container process may be configured to enable one or more applications and/or processes (e.g., such as a browser process) being executed within the sandboxed computing environment 118 to access the resources allocated for operation of the sandbox container process. For example, the one or more applications and/or processes being operated within the sandboxed computing environment 118 may be allowed to access memory associated with the sandboxed computing environment 118. The memory associated with the sandboxed computing environment 118 may be separate from memory that is configured to enable storage and operation of the workspace 114.

The workspace 114 may include one or more processes operating within the operating system 122 that are not restricted by the sandbox container process. The operating system 122 of the host computer system may include a set of resources configured to enable operation of the workspace 114 and the sandbox container process.

The trusted host computer system 110 may enable the host-based firewall 112. The host-based firewall 112 may prohibit communication (e.g., direct communication) between the trusted host computer system 110 and other devices on the untrusted LAN 124. For example, the host-based firewall 112 may be configured to block incoming traffic to the trusted host computer system 110.

The host-based firewall 112 may be implemented using software and/or hardware. For example, the host-based firewall 112 may be implemented using software that is commercially available, for example, such as Symantec Endpoint Protection, MacAfee Host Based Security Systems, etc. The host-based firewall 112 may be implemented using software inherent in the operating system 122 of the trusted host computer system 110, for example the Windows operating system firewall. The host-based firewall 112 may be implemented using software for configuring and/or implementing restrictive ingress and/or egress policies on the trusted host computer system 110. Such commercial implementations may be configured to implement rules that prevent communications other than those associated with the sandbox browser program 120 and/or certain preauthorized application (e.g., VPN client) using predetermined protocols and resources (e.g., predetermined ports and procedures) from communicating via the untrusted LAN 124.

The trusted host computer system 110 may support a VPN client (not shown). The VPN client may operate within the operating system 122 of the trusted host computer system 110. The VPN client may create a secure and/or encrypted communication path through the untrusted LAN 124 and the Internet 126 to a trusted LAN 130.

The VPN client may be implemented using software and/or hardware. For example, the VPN client may be implemented using software that is commercially available, for example, such as CheckPoint Mobile, NordVPN, and/or Cisco VPN client. The VPN may be programmed to use a specific communication pattern and/or specific communication resources when establishing the VPN connection with the trusted LAN 130. The host-based firewall 112 may prevent the VPN client (or any other applications running outside of sandboxed computing environment 118) from communicating via the untrusted LAN 124 unless the specific communication pattern and/or specific communication resources are used for performing such communications.

The trusted host computer system 110 may enable the sandboxed computing environment 118, for example, using the sandbox container process. The sandbox container process may run within the operating system 122 of the trusted host computer system 110. For example, the sandbox container process may be configured to run within a first memory space of the trusted host computer system 110. The first memory space may be configured to enable storage and operation of a workspace 114 configured to execute a first set of one or more applications and/or processes running on the operating system 122 of the trusted host computer system 110. A sandbox browser program 120 may be configured to enable access to untrusted network destinations.

Browser solutions running within the workspace 114 of the trusted host computer system 110 may be utilized for communication between the trusted host computer system 110 and trusted network destinations. For example, browser processes running within the workspace 114 of the trusted host computer system 110 may enable access to the trusted network destinations via a VPN client. One or more processes or applications within the workspace may be allowed to access a trusted destination provided a predetermined protocol (e.g., a VPN, communication using a set protocol on a set communication port, etc.), is used. In an example, a process or application in the workspace may be blocked from accessing a trusted destination if a predetermined communication protocol is not followed. In another example, the one or more applications or processes in the workspace may be allowed to access a trusted destination without having to utilize a predetermined protocol.

The sandboxed computing environment 118 and/or the sandbox container process may be implemented using software and/or hardware. For example, the sandboxed computing environment 118 and/or the sandbox container process may be implemented using software that is commercially available, for example, such as Invincea Endpoint Protection, Tanium Endpoint Platform, Bromium Advanced Endpoint Security, etc.

The sandboxed computing environment 118 may provide separate and/or isolated memory space from the workspace 114 of the trusted host computer system 110. For example, the sandboxed computing environment 118 may be enforced using a sandbox container process. The sandbox container process may segregate the workspace 114 from the sandboxed computing environment 118. The first memory space (e.g., the workspace memory) may enable storage and/or operation of the workspace 114. The operating system 122 may enable operation of the sandboxed computing environment 118. The second memory space may enable storage and/or operation of one or more applications and/or processes associated with the sandboxed computing environment 118. For example, the second memory space may be reserved for storage and/or operation of the applications and/or processes running within the sandboxed computing environment 118. The sandbox container process may isolate the first memory space and the second memory space. For example, the sandbox container process may enable the sandbox firewall 116. The sandbox firewall 116 may enforce a separation of the first and second memory spaces. For example, the sandbox firewall 116 may allow a predefined set of processes to be executed within the sandboxed computing environment 118. The sandbox firewall 116 may prevent execution, in the sandboxed computing environment 118, of any processes outside of the predefined set of processes. The second memory space may be referred to as a separate and/or isolated memory space. The sandbox container process may segregate, to the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory. The first memory space and the second memory space may be enforced via a software partition.

The trusted host computer system 110 may be configured to connect to the trusted LAN 130 or the untrusted LAN 124. When the trusted host computer system 110 is connected to the trusted LAN 130, the host-based firewall 112 may implement a first configuration. When the trusted host computer system 110 is connected to the untrusted LAN 124, the host-based firewall 112 may implement a second configuration. The first configuration may be associated with blocking incoming traffic to the trusted host computer system 110 that does not come from one or more predefined devices and/or via one or more predefined ports. In the first configuration, the host-based firewall 112 may allow outgoing traffic to be sent from one or more processes or applications in the workspace 114, for example irrespective of the type of communication protocol used. In an example, the second configuration may be associated with preventing one or more applications and/or processes operating on the workspace 114 of the trusted host computer system 110 from communicating with one or more untrusted destinations. In an example, the second configuration may be associated with blocking all incoming traffic from the untrusted LAN 124 to the trusted host computer system 110.

When the host-based firewall 112 is configured in the second configuration, the host-based firewall 112 may allow one or more of the applications and/or process operating within the workspace 114 to communicate with a trusted network destination on condition that a predetermined set of communication protocols. The predetermined set of protocols may include communicating with the trusted network destination via a VPN client associated with the workspace 114. The trusted network destination may be located on the trusted LAN 130. The VPN client may be configured to establish an encrypted communication system with the trusted network destination via the untrusted LAN 124. For example, the second configuration of the host-based firewall may enable one or more applications and/or processes operating within the workspace 114 to access the trusted LAN 130 via the untrusted LAN 124 and/or the Internet 126 using the VPN client.

In this manner, the host-based firewall 112 can allow the processes or applications of the workspace 114 to send outgoing communications without restriction when implementing the first configuration (e.g., when connected to the trusted LAN), but may limit outgoing communications from the processes or applications of the workspace 114 to communications to trusted destinations that also utilize a predetermined protocol in order to communicate with the trusted destination. In both the first and second configurations, the host-based firewall may block incoming communications to the workspace unless the communication is from a trusted destination and uses a predetermined communication protocol.

The workspace 114 may include one or more host monitoring processes configured to monitor operation of the sandbox container process. When the host-based firewall 112 is configured in the second configuration, the host-based firewall 112 may allow the at least one host monitoring process to communicate with a trusted central monitoring system, for example in order to communicate information regarding the monitoring of the sandbox container process. The trusted central monitoring system may be located on the trusted LAN 130. The one or more host monitoring processes may be configured to communicate with the trusted central monitoring system using a predetermined communication protocol that may be permitted by the second configuration of the host-based firewall 112. When at least one host monitoring process is unable to communicate with the trusted central monitoring system, one or more monitoring events may be logged by the one or more host monitoring processes. The one or more host monitoring processes may be configured to send the log to the trusted central monitoring system, for example, upon establishing a communication channel with the trusted central monitoring system.

The second memory space and the processes therein, may have limited access to the resources, assets, and/or files of the remainder of the computer-accessible data storage or memory space of the trusted host computer system 110. Data transfers between the sandboxed computing environment 118 and the workspace 114 of the trusted host computer system 110 may be restricted to set transfer types. The set transfer types may be configured to minimize the possibility of malicious data migrating from the sandboxed computing environment 118 to the workspace 114 of the trusted host computer system 110. The sandboxed computing environment 118 may transfer (e.g., only transfer) data to or from the workspace 114 of the trusted host computer system 110 in response to a user input directing the data transfer. The user input may be an explicit user input such as checking a box and/or selecting a button on an information prompt. The set transfer types that require user input may include one or more manual operations. For example, the set transfer types may include a cut or copy of data, a paste of data, a printing of data to a local printer, or a file transfer.

The operating system 122 may access (e.g., only access) the second memory space associated with the sandboxed computing environment 118 as required for the proper operation of the sandboxed computing environment 118. The sandbox firewall 116 may be built-in with the sandboxed computing environment 118.

The sandboxed computing environment 118, when activated, may enable communication (e.g., indirect communication) between the trusted host computer system 110 and the untrusted LAN 124 and/or an untrusted network destination on the Internet 126. The sandboxed computing environment 118 may be activated via a desktop shortcut and/or one or more predetermined applications on the operating system 122 of the trusted host computer system 110.

As an example, an application short cut located on the user's desktop space, the desktop toolbar, and/or the standard program Start screen may be activated, for example, by a user selection. The sandbox container process may detect when a browser program is selected for activation. When the browser program is activated, the sandbox container process may terminate one or more running browser program processes and/or may activate the browser program 120 within the sandboxed computing environment, as described herein.

The sandboxed computing environment 118, when activated, may enable indirect communication with the Internet 126 via one or more proxy/web-content filters. For example, a proxy/web-content filter 128 may be included on a trusted LAN 130. The sandboxed computing environment 118 may access the proxy/web-content filter 128 via the untrusted LAN 124, the Internet 126, and/or the trusted LAN 130. As another example, a proxy/web-content filter 128 may be cloud-based and/or outsource computer network-based. The sandboxed computing environment 118 may access the proxy/web-content filter 128 via the Internet 126 and/or the untrusted LAN 124.

The sandbox process associated with the browser program 120, when activated by the sandbox container process may initiate a communication session directly to an untrusted network destination.

The sandbox process associated with the browser program 120, when activated by the sandbox container process, may initiate a communication session to the proxy/web-content filter 128 and/or the proxy/web-content filter 134. During the initiation of the communication session, the sandboxed computing environment 118 may validate the authenticity of a sandbox browser process request for the communication session. The sandboxed computing environment 118 may authenticate the sandbox browser process request using one or more authentication mechanisms with the proxy/web-content filter 128 and/or the proxy/web-content filter 134. If the sandbox browser process request fails authentication, the communication session may be terminated, for example, by the proxy/web-content filter 128 and/or the proxy/web-content filter 134.

The sandbox container process may initiate a communication session with the proxy/web-content filter 128 using an authentication mechanism. For example, the authentication procedure may use a predetermined protocol and may communicate with the proxy/web-content filter 128 using a predetermined communication port. As an example, the sandbox container process may initiate the sandbox process associated with the browser program 120 and the communication session with the proxy/web-content filter 128 using an NT LAN Manager (NTLM) and the predetermined network port 1111. As another example, the sandbox container process may initiate the communication session with the proxy/web-content filter 128 using a Secure Socket Layer (SSL) and the predetermined network port 1111. As part of the communication session, the sandboxed computing environment 118 may send validation credentials to the proxy/web-content filter 128 and/or the proxy/web-content filter 134, for example, using a predetermined authentication mechanism. The predetermined authentication mechanism may be a username/password combination. The username/password combination may be encrypted, for example, with an asymmetric or a symmetric encryption key system. The proxy/web-content filter 128 may be the only device able to decrypt the username/password combination.

The sandbox container process may be configured to authenticate with the proxy/web-content filter 128. For example, the sandbox container process may authenticate with the proxy/web-content filter 128 on behalf of the sandbox browser process associated with the browser program 120. The sandbox container process may authenticate with the proxy/web-content filter 128 using credentials stored in a configuration file. The configuration file may be encrypted. For example, the sandbox container process may be configured to read only encrypted configuration files.

Upon successful creation of a communication session between the sandboxed computing environment 118 and the proxy/web-content filter 128, the proxy/web-content filter 128 may analyze and/or validate the request to communicate with the untrusted network destination on the Internet 126. If the request to communicate with the Internet 126 is permitted, the proxy/web-content filter 128 may act as an intermediary communication point between the sandboxed computing environment 118 and the untrusted network destination on the Internet 126.

A user may initiate a browser process and may enter and/or select a network destination. The trusted host computer system 110 may initiate the browser process in the workspace 114 or the sandboxed computing environment 118. The trusted host computer system 110 may determine whether the network destination is trusted or untrusted. The trusted host computer system 110 may provide access to a trusted network destination via the browser process executed in the workspace 114, for example, using a VPN client. The trusted host computer system 110 may provide access to an untrusted network destination via the browser process executed in the sandboxed computing environment 118. For example, the sandbox container process may be configured to spawn an instance of the browser process in the sandboxed computing environment 118 to provide access to the untrusted network destination.

As an example, a sandbox container process may determine that a browser process operating in the workspace 114 is attempting to access an untrusted network destination. The sandbox container process may spawn an instance of the browser process in the sandboxed computing environment 118 to provide access to the untrusted network destination. As an example, the sandbox container process may determine that the browser process operating in the workspace 114 is attempting to access a trusted network destination. The sandbox container process may allow the browser process operating in the workspace 114 to access the trusted network destination, for example using a VPN client.

As another example, the sandbox container process may determine that the browser process operating in the sandboxed computing environment 118 is attempting to access an untrusted network destination. The sandbox container process may allow the browser process operating in the sandboxed computing environment 118 to access the untrusted network destination. The sandbox container process may determine that the browser process operating in the sandboxed computing environment 118 is attempting to access a trusted network destination. The sandbox container process may spawn an instance of a browser process in the workspace 114 to provide access to the trusted network destination, for example, using a VPN client.

The sandboxed computing environment 118 may receive malware from an untrusted network device. For example, the sandboxed computing environment 118 may enable communication with the untrusted network device on the Internet 126 (e.g., via the proxy/web-content filter 128, via the proxy/web-content filter 134, or directly). The untrusted network device may send malware (e.g., malicious software) to the sandboxed computing environment 118. The malware may be executed within the sandboxed computing environment 118. The executed malware may start one or more processes, download one or more payloads, and/or execute the one or more payloads. The processes and/or payloads may be executed within the sandboxed computing environment 118, for example, instead of on the workspace 114 of the operating system 122. When the sandboxed computing environment 118 has received malware, the sandboxed computing environment 118 may be considered infected and may be considered untrusted.

Even when the sandboxed computing environment 118 is infected and/or untrusted, the use of the sandbox based isolation may allow the trusted host computer system 110 to be considered to be uninfected and trusted. The trusted host computer system 110 may be considered uninfected and trusted because the memory space of the sandboxed computing environment 118 (e.g., the second memory space) and the processes operating therein may be separated and isolated from the memory space for the workspace 114 (e.g., the first memory space) of the trusted host computer system 110. The introduced malware may not be able to access the resources, assets, and/or files of the operating system 122. For example, the sandbox firewall 116 may prevent the introduced malware from accessing the resources, assets, and/or files of the operating system 122.

A sandboxed computing environment 118 that becomes infected and/or untrusted may encounter problems. The sandbox container process associated with the infected sandboxed computing environment may become inoperable, for example, due to the introduced malware. An infected sandbox container process may restore a pristine copy (e.g., a "clean slate") of the sandboxed computing environment 118 processes and/or its separated and isolated memory space. An infected sandboxed computing environment may be cleared (e.g., immediately) and reverted to its original, trusted condition. For example, one or more (e.g., all) aspects of the introduced malware may be removed from the sandboxed computing environment 118 without any harm to the operating system 122. The sandbox container process may initiate a "clean slate" periodically, e.g., once a day, once every 12 hours, once an hour, etc. The sandboxed computing environment 118 may initiate a "clean slate" on demand, e.g., based on an indication and/or input received from the user of the trusted host computer system 110. The "clean slate" may be initiated using a restore capability of the sandbox container process.

For example, the workspace 114 of the trusted host computer system 110 may include at least one host monitoring process. The at least one host monitoring process may be configured to monitor the sandboxed computing environment 118 and/or the sandbox container process. The at least one host monitoring process may be configured to restore the sandbox container process to a known good version. The at least one host monitoring process may be configured to restore the sandbox container process based on one or more of a user input, an application input, detection of an abnormality in the sandbox container process, or expiration of predetermined period of time (e.g., a timer-based refresh mechanism).

The trusted host computer system 110 may be configured to store a restore point of the sandboxed computing environment 118. The restore point may be associated with a configuration of the sandboxed computing environment 118. The trusted host computer system 110 (e.g., an application or process operating within the workspace 114) may detect anomalous behavior within the sandboxed computing environment 118. The trusted host computer system 110 may restore the sandboxed computing environment 118 to the restore point, for example, based on detection of the anomalous behavior.

If malware on an infected sandboxed computing environment is able to access the resources, assets, and/or files of the operating system 122, the trusted host computer system 110 may be considered infected and untrusted. For example, the malware may bypass the sandbox firewall 116 via explicit user input. The host-based firewall 112 may prohibit the introduced malware from communicating with any other device on the untrusted LAN 124 and/or the Internet 126. For example, the host-based firewall 112 may be configured to block incoming and/or outgoing traffic from/to the untrusted LAN 124.

Malware may be introduced to the operating system 122 from a source other than communication with the untrusted LAN 124 and/or the Internet 126. For example, malware may be introduced to the operating system 122 via an infected email, an infected USB memory stick, and/or another infected hardware device.

An infected and/or untrusted host computer system (e.g., regardless of the introduced malware's vector) may have no communication (e.g., direct communication) with the untrusted LAN 124 and/or the Internet 126. For example, the sandbox container process may be configured to prevent the processes and applications in the workspace 114 from being allowed to access untrusted resources (e.g., via the Internet 138), which may prevent malware introduced into the workspace 114 from communicating with its source or other devices. Further, the border firewall 126 may prevent the infected and/or untrusted host computer system from communicating with the Internet 138. For example, the border firewall 126 may be configured to block traffic to untrusted sources sent from the host computer system unless the traffic originates from the sandboxed computing environment 118 (e.g., and is routed through the web-proxy as described herein). Without a connection to (e.g., communication with) the untrusted LAN 124 and/or the Internet 126, the introduced malware may be prevented from performing many toolset functions from within the workspace 114 as described herein or any other function that an enslaved, infected and/or untrusted host computer system may perform. Without a connection to the Internet 126, the introduced malware may not be able to transfer any data from the infected and/or untrusted host computer system (e.g., the workspace 114) to the untrusted LAN 124 and/or the Internet 126.

Malware may attempt to circumvent implemented host-based security protections. For example, the introduced malware may attempt to tamper with processes that are critical to the functioning of the host-based security protections. The trusted host computer system 110 may monitor the host-based security protections for tampering (e.g., by way of secondary processes or security applications). The trusted host computer system 110 may determine that one or more host-based security protection related processes have been tampered with, are missing, have stopped, and/or have been otherwise altered. Host-based security protection related processes may include processes associated with the host-based firewall 112 and/or the sandboxed computing environment 118 running on the operating system 122. The trusted host computer system 110 may initiate unaltered versions of the tampered, missing, stopped, and/or otherwise altered host-based security protection related processes.

The trusted host computer system 110 may monitor for any exceptions to normal and trusted operations of the trusted host computer system 110. The trusted host computer system 110 may send an alert message to a central monitoring security system 132, for example, on the trusted LAN 130. The alert message may indicate that one or more security protection related processes were restarted (e.g., automatically restarted). The alert message may include such details as required for the proper detection and remediation of the introduced malware.

When the trusted host computer system 110 is not connected (e.g., directly connected) to the trusted LAN 130, a VPN client may enable communication between one or more secondary processes and the central monitoring security system 132. For example, the VPN client may be required for successful communication between the secondary processes and the central monitoring security system 132.

When the trusted host computer system 110 is connected to a trusted LAN 130, the use of a VPN client for communication between the secondary processes and/or security applications and a central monitoring security system 132 located on the trusted LAN 130 may not be required.

When the trusted host computer system 110 is unable to communicate with the central monitoring security system 132 at the time of an exception alert, the secondary processes and/or security applications may store the exception alert locally. The secondary processes and/or security applications may transfer one or more (e.g., all) exception alert data to the central monitoring security system 132, for example, when communication is restored between the trusted host computer system 110 and the central monitoring security system 132.

The trusted host computer system 110 may detect blocked communication attempts and/or exceptions using one or more of an event log or another source.

When an infected and/or untrusted host computer system is detected, remediation may be performed. Remediation may include one or more of analysis of the untrusted host computer system, removal of the introduced malware from the untrusted host computer system, rebuilding of the untrusted host computer system to a trusted configuration, and/or replacing the untrusted host computer system with another trusted host computer system (e.g., such as the trusted host computer system 110).

The trusted host computer system 110 and/or the configuration thereof may limit the adverse effects of a received malware. For example, the trusted host computer system 110 may prevent the received malware from using its vector to communicate data from the trusted host computer system 110.

An author of the malware may not be aware of any level of efficacy of the introduced malware, its successful attack vector, and/or any data of an infected host computer system that may have been compromised or collected, for example, because the trusted host computer system 110 may block the workspace 114 from using resources allocated for the sandboxed computing environment 118. The trusted host computer system 110 may block the workspace from accessing untrusted network destinations.

An electronic mail (email) may be exchanged between the trusted host computer system 110 and the trusted LAN 130 and/or the Internet 126 may be accomplished through a web browser application. For example, the exchange of email may be accomplished via the sandboxed computing environment 118 and may be protected from malware. The protection controls described herein (e.g., the host-based firewall 112 and/or the sandboxed computing environment 118) may protect the trusted host computer system 110 from malware as described herein.

When the trusted host computer system 110 is not connected (e.g., directly) to a trusted LAN 130, a VPN client may be used for an email exchange between the trusted host computer system 110 and an email server located on the trusted LAN 130.

One or more files may be exchanged between the trusted host computer system 110 and the Internet 126. The trusted host computer system 110 may exchange files to a device on the Internet 126. A file transfer may be initiated from the trusted host computer system 110 and/or from the device on the Internet 126. The file transfer may utilize an encrypted protocol via a predetermined network port. Authenticity of the file transfer may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the trusted host computer system 110.

One or more files may be downloaded via the sandbox browser program 120. The file(s) may be transferred from the sandboxed computing environment 118 to the workspace 114. For example, the sandboxed computing environment 118 may enable a user initiated file transfer to the workspace 114. The file(s) may be transferred to the workspace 114 based on a received user selection. The file(s) may have been exchanged from a device on the Internet 126 to the trusted host computer system 110 (e.g., the sandboxed computing environment 118). The file transfer from the device on the Internet 126 to the trusted host computer system 110 may use an encrypted protocol (e.g., the same encrypted protocol as that used when files are transferred from the trusted host computer system 110 to the device on the Internet 126) via a predetermined network port. Authenticity of the file(s) and/or the device may be validated, for example, prior to any data transfer.

The trusted host computer system 110 may be configured to enable cutting and/or copying text displayed in the sandboxed computing environment 118 and pasting the cut and/or copied text within a program running in the workspace 114. The trusted host computer system 110 may be configured to enable printing from the sandboxed computing environment 118 to a local printer (not shown).

Figure 3:
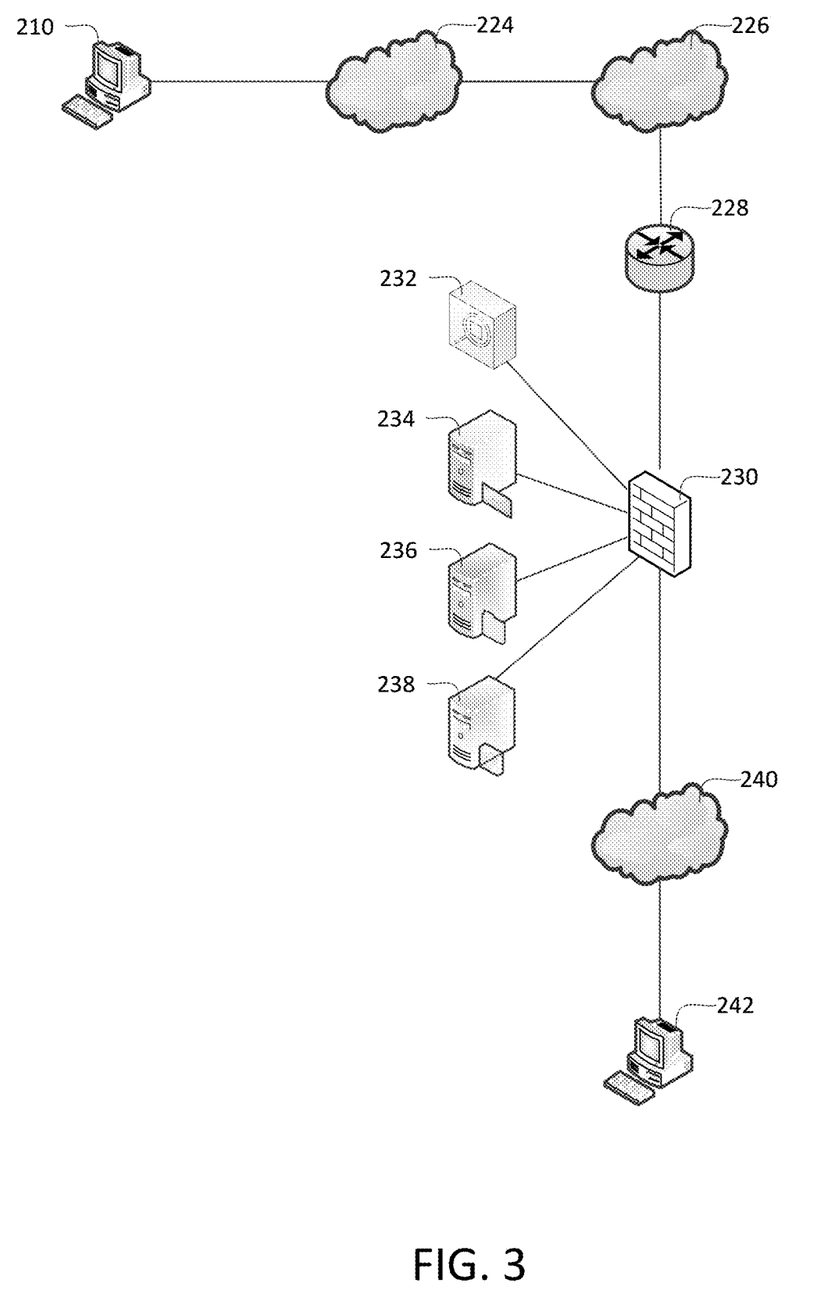
FIG. 3 depicts an example host computer system using a sandbox based internet isolation system on an untrusted LAN.

FIG. 3 depicts a host computer system 210 (e.g., such as the trusted host computer system 110 shown in FIG. 2) using a sandbox based internet isolation system on an untrusted LAN 224. The sandbox based internet isolation system may be a sandboxed computing environment (e.g., such as the sandboxed computing environment 118 shown in FIG. 2) as described herein. The untrusted LAN 224 may connect to the Internet 226. A trusted host computer system 242 (e.g., such as the trusted host computer system 110 shown in FIG. 2) may connect to the Internet 226, for example, via a trusted LAN 240, a border firewall 230, and/or a border router 228. The trusted host computer system 242 may include an internet isolation system, e.g., such as the sandboxed computing environment 118 shown in FIG. 2.

The sandboxed computing environment may include resources (e.g., a limited set of resources) allocated to operation of a sandbox container process. The sandboxed computing environment may be enforced via the sandbox container process. The sandbox container process may be a security mechanism used to separate resources associated with the sandboxed computing environment from other applications and/or processes that may be running on a workspace of the host computer system 210. The sandboxed container process may be configured to enable one or more applications and/or processes (e.g., such as a browser process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace.

The workspace may include one or more processes operating within the operating system that are not restricted by the sandbox container process. The operating system of the host computer system 210 may include a set of resources configured to enable operation of the workspace and the sandbox container process.

A proxy/web-content filter 232 may be connected to the border firewall 230. The proxy/web-content filter 232 may, for example, in cooperation with the border firewall 230, control the type of data permitted to pass between the trusted LAN 240 and the Internet 226. For example, the proxy/web-content filter 232 may block data not intended for the trusted LAN 240 such as pornographic data, gambling data, and/or any data that has been pre-determined as inappropriate. The proxy/web-content filter 232 may enable the border firewall 230 to block communication between one or more devices on the trusted LAN 240 and sites on the Internet 226, such as pornographic sites, gambling sites, and/or any sites that have been pre-determined as inappropriate.

The border firewall 230 may be configured to terminate any communication between one or more devices and the Internet 226. For example, the border firewall 230 may be configured to block untrusted traffic that is not routed through the proxy/web-content filter 232. The border firewall 230 may have one or more exceptions. For example, one or more predetermined devices and/or applications may bypass the border firewall 230, for example, using a predetermined set of protocols. The one or more devices may include one or more electronic mail servers (e.g., such as the intermediary email device 234), one or more domain name service servers (not shown), the proxy/web-content filter 232, a secure file transfer server (e.g., such as the intermediary secure transfer device 236), a central monitoring security system 238, and/or any other service providing devices. Communication between the one or more devices and the Internet 226 may utilize one or more protocols required for the proper functioning of said devices.

The proxy/web-content filter 232 may be configured to analyze and/or validate communication between the trusted LAN 240 and the Internet 226, e.g., a device on the Internet 226. Some communication, for example, between predetermined devices and/or via a predetermined set of protocols, may not be analyzed or validated by the proxy/web-content filter 232. The proxy/web-content filter 232 may determine that communication between a device on the trusted LAN 240 and the Internet 226 is allowed. If the proxy/web-content filter 232 determines communication between the device and the Internet 226 is allowed, the proxy/web-content filter 232 may act as an intermediary communication point between the device on the trusted LAN 240 and the device on the Internet 226. If the proxy/web-content filter 232 determines communication between the device and the Internet 226 is not permitted, it may terminate the communication (e.g., communication session).

The trusted LAN 240 may be configured to utilize a Web Cache Control Protocol. The trusted LAN 240 may redirect web related traffic that is destined for the Internet 226 to the proxy/web-content filter 232, for example, using the Web Cache Control Protocol. The Web Cache Control Protocol may route the web-related traffic to the proxy/web-content filter 232 via a predetermined network port, for example, network port 1111. The proxy/web-content filter 232 may determine (e.g., uniquely distinguish) that traffic from the trusted LAN 240 is received via the Web Cache Control Protocol, for example, based on the network port.

The host computer system 210 may support a VPN client (not shown). The VPN client may operate within the operating system of the host computer system 210. The VPN client may create a secure and/or encrypted communication path through the untrusted LAN 224, the Internet 226, the border router 228, and/or the border firewall 230 to the trusted LAN 240.

The VPN client may be implemented using software and/or hardware. For example, the VPN client may be implemented using software that is commercially available, for example, such as CheckPoint Mobile, NordVPN, and/or Cisco VPN client.

One or more files may be exchanged between the host computer system 210 and the Internet 226. The host computer system 210 may exchange files to a device on the Internet 226. A file transfer may be initiated from the host computer system 210 and/or from the device on the Internet 226. The file transfer may utilize an encrypted protocol via a predetermined network port.

One or more files may be exchanged between the host computer system 210 and the trusted LAN 240, for example, the trusted host computer system 242. A file transfer may be initiated from the host computer system 210 and/or from the trusted LAN 240. For example, the trusted host computer system 242 may initiated the file transfer. The file transfer may utilize an encrypted protocol via a predetermined network port.

Authenticity of the file transfer may be validated, for example, prior to any data transfer. For example, files may be copied using Secure Socket Shell (SSH) or Secure Socket Shell File Transfer Protocol (SFTP) operating over the network port 22. Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the host computer system 210.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD- ROM), compact disk-read/write (CD-R/W) and DVD. A processor may be configured to execute instructions stored in memory to perform the various functions and/or functional modules described herein.

What is claimed:

1. A host computer system, wherein the host computer system comprises a processor and memory configured to implement at least:
   a first memory space that is configured to enable storage and operation of a workspace configured to execute a first set of one or more applications and processes running on a trusted operating system of the host computer system;
   a second memory space that is configured to enable storage and operation of a second set of one or more applications and processes associated with a sandboxed computing environment configured to run on the trusted operating system, wherein the second set of one or more applications and processes comprise a first browser process configured to operate within the sandboxed computing environment, the first browser process being configured to access the Internet and other untrusted resources;
   a sandbox container process that enforces the sandboxed computing environment, wherein the sandbox container process segregates the workspace associated with the first memory space from the sandboxed computing environment associated with the second memory space, and wherein the sandbox container process is configured to prevent data from being communicated between the sandboxed computing environment and the workspace without an explicit user input, and wherein the sandbox container process is configured to:
      determine that a second browser process operating in the workspace is attempting to access an untrusted network destination;
      configure an instance of the second browser process in the sandboxed computing environment to access the untrusted network destination;
      determine that the first browser process operating in the sandboxed computing environment is attempting to access a trusted network destination; and
      configure an instance of the first browser process in the workspace in order to access the trusted network destination; and
   a first firewall configured to operate between the workspace of the first memory space and a local area network (LAN), wherein the first firewall is configured to determine whether the host computer system is connected to a trusted LAN or an untrusted LAN, wherein the first firewall implements a first configuration when the host computer system is connected to the trusted LAN and a second configuration when the host computer system is connected to the untrusted LAN, wherein the second configuration is such that the first firewall prevents unauthorized communication between the first set of one or more applications and processes and one or more untrusted network destinations.

2. The host computer system of claim 1, wherein the sandboxed computing environment is configured to classify a network destination as trusted or untrusted based on one or more of a whitelist comprising a list of trusted network destinations or a blacklist comprising a list of untrusted network destinations.

3. The host computer system of claim 2, wherein the first configuration of the first firewall allows the first set of one or more applications and processes to send one or more communications directly to one or more trusted network destinations on the trusted LAN without requiring the first set of one or more applications and processes to utilize a predetermined set of communication protocols.

4. The host computer system of claim 1, wherein the second configuration implemented by the first firewall allows the first browser process associated with the second memory space to access the one or more untrusted network destinations.

5. The host computer system of claim 1, wherein the second configuration implemented by the first firewall allows one or more of the first set of one or more applications and processes to communicate with a trusted network destination using a predetermined set of communication protocols.

6. The host computer system of claim 5, wherein the predetermined set of communication protocols comprises communicating with the trusted network destination via a virtual private network (VPN) client associated with the workspace.

7. The host computer system of claim 6 wherein the trusted network destination is located on the trusted LAN, and the VPN client associated with the workspace is configured to establish an encrypted communication system with the trusted network destination via the untrusted LAN.

8. The host computer system of claim 1, wherein the workspace comprises at least one host monitoring process configured to monitor operation of the sandbox container process.

9. The host computer system of claim 8, wherein the at least one host monitoring process is configured to restore the sandbox container process to a known good version based on one or more of a user input, an application input, detection of an abnormality in the sandbox container process, or expiration of a predefined time.

10. The host computer system of claim 8, wherein the second configuration of the first firewall allows the at least one host monitoring process to communicate with a trusted central monitoring system in order to communicate information regarding the monitoring of the sandbox container process.

11. The host computer system of claim 10, wherein the trusted central monitoring system is located on the trusted LAN, and the at least one host monitoring process is configured to communicate with the trusted central monitoring system using a predetermined communication protocol that is permitted by the second configuration of the first firewall.

12. The host computer system of claim 10, wherein on condition that the at least one host monitoring process is unable to communicate with the trusted central monitoring system, one or more monitoring events are logged by the at least one host monitoring process, and the at least one host monitoring process is configured to send the log to the trusted central monitoring system upon establishing a communication channel with the trusted central monitoring system.

13. The host computer system of claim 1, wherein the second configuration of the first firewall allows one or more of the first set of one or more applications and processes to access the trusted LAN via the untrusted LAN and the Internet using a Virtual Private Network (VPN) client configured to provide access to the trusted LAN via the untrusted LAN and the Internet.

14. The host computer system of claim 1, wherein the sandbox container process comprises a second firewall, and wherein the second firewall enforces a separation of the first and second memory spaces by:
  segregating storage memory associated with the workspace and the sandboxed computing environment; and
  allowing a predefined set of processes to be executed within the sandboxed computing environment, wherein the second firewall prevents execution within the sandboxed computing environment of any processes outside of the predefined set of processes.

15. A trusted host computer system configured to connect to an untrusted local area network (LAN), the trusted host computer system comprising:
  a processor and memory configured to:
    configure a first memory space within the memory that is configured to enable storage and operation of a workspace configured to execute a first set of one or more applications and processes running on a trusted operating system of the trusted host computer system, the first set of one or more applications and processes allowed to execute in the workspace comprising a first browser process;
    configure a second memory space within the memory that is configured to enable storage and operation a second set of one or more applications and processes associated with a sandboxed computing environment configured to run on the trusted operating system, wherein the second memory space is isolated from the first memory space, the second set of one or more applications and processes allowed to execute in the sandboxed computing environment comprising a second browser process; and
    implement a container process that is configured to enforce a segregation between the first memory space that is configured to enable storage and operation of the workspace configured to execute the first set of one or more applications and processes and the second memory space that is configured to enable storage and operation the second set of one or more applications and processes associated with the sandboxed computing environment, wherein the container process is configured to:
      determine that the first browser process, operating in the workspace of the trusted host computer system that is configured to connect to the untrusted LAN, is attempting to access an untrusted network destination;
      configure an instance of the second browser process in the sandboxed computing environment to access the untrusted network destination;
      determine that the second browser process, operating in the sandboxed computing environment of the trusted host computer system that is configured to connect to the untrusted LAN, is attempting to access a trusted network destination; and
      configure an instance of the first browser process in the workspace in order to access the trusted network destination using a Virtual Private Network (VPN) client.

16. The trusted host computer system of claim 15, wherein the processor and memory are further configured to implement a first firewall configured to operate between the workspace of the first memory space and a local area network (LAN), wherein the first firewall is configured to determine whether the trusted host computer system is connected to a trusted LAN or an untrusted LAN, wherein the first firewall implements a first configuration when the trusted host computer system is connected to the trusted LAN and a second configuration when the trusted host computer system is connected to the untrusted LAN, wherein the second configuration is such that the first firewall prevents unauthorized communication between the first set of one or more applications and processes and one or more untrusted network destinations.

17. The trusted host computer system of claim 16, wherein the container process is a sandbox container process configured to enforce the sandboxed computing environment.

18. The trusted host computer system of claim 16, wherein the first configuration of the first firewall allows the first set of one or more applications and processes to send one or more communications directly to one or more trusted network destinations on the trusted LAN without requiring the first set of one or more applications and processes to utilize a predetermined set of communication protocols.

19. The trusted host computer system of claim 16, wherein the second configuration implemented by the first firewall allows the second browser process associated with the second memory space to access the one or more untrusted network destinations.

20. A method performed by a trusted host computer system connected to an untrusted local area network (LAN), the method comprising:
  configuring a first memory space within the memory that is configured to enable storage and operation of a workspace configured to execute a first set of one or more applications and processes running on a trusted operating system of the trusted host computer system, the first set of one or more applications and processes allowed to execute in the workspace comprising a first browser process;
  configuring a second memory space within the memory that is configured to enable storage and operation a second set of one or more applications and processes associated with a sandboxed computing environment configured to run on the trusted operating system, wherein the second memory space is isolated from the first memory space, the second set of one or more applications and processes allowed to execute in the sandboxed computing environment comprising a second browser process;
  implementing a container process that is configured to enforce a segregation between the first memory space that is configured to enable storage and operation of the workspace configured to execute the first set of one or more applications and processes and the second memory space that is configured to enable storage and operation the second set of one or more applications and processes associated with the sandboxed computing environment;
  determine that the first browser process, operating in the workspace of the trusted host computer system that is configured to connect to the untrusted LAN, is attempting to access an untrusted network destination;
  configure an instance of the second browser process in the sandboxed computing environment to access the untrusted network destination;
  determine that the second browser process, operating in the sandboxed computing environment of the trusted host computer system that is configured to connect to the untrusted LAN, is attempting to access a trusted network destination; and configuring an instance of the first browser process in the workspace in order to access the trusted network destination using a Virtual Private Network (VPN) client.

\* \* \* \* \*